United States Patent [19]

Heldwein et al.

[11] 4,229,737
[45] Oct. 21, 1980

[54] RANGING SYSTEM AND METHOD FOR DETERMINING THE RANGE OF A VEHICLE FROM A PLURALITY OF REFERENCE POINTS

[75] Inventors: Carl A. Heldwein, San Diego; Richard N. Jekel, La Mesa; Stephen R. Sampson; John T. Zupan, both of San Diego, all of Calif.

[73] Assignee: Cubic Western Data, San Diego, Calif.

[21] Appl. No.: 875,421

[22] Filed: Feb. 6, 1978

[51] Int. Cl.³ .............................................. G01S 13/87
[52] U.S. Cl. .................................. 343/6 R; 343/6.5 R; 343/105 LS; 343/112 D
[58] Field of Search ............... 343/6.5 R, 15, 112 D, 343/112 R, 6 R, 6.5 LC, 105 LS

[56] References Cited

U.S. PATENT DOCUMENTS

| | | | |
|---|---|---|---|
| 3,153,232 | 10/1964 | Fletcher et al. | 343/6.5 LC X |
| 3,303,499 | 2/1967 | Mahoney et al. | 343/15 |
| 3,412,399 | 11/1968 | Chisholm | 343/6.5 R |
| 3,611,379 | 10/1971 | Deckett | 343/15 |
| 3,714,650 | 1/1973 | Fuller et al. | 343/15 |
| 3,766,552 | 10/1973 | Hajduk | 343/6 R |
| 3,774,215 | 11/1973 | Reed | 343/112 R |
| 4,011,562 | 3/1977 | Bruce | 343/6.5 LC X |
| 4,024,383 | 5/1977 | Beasley | 343/112 R |
| 4,083,047 | 4/1978 | Schalow | 343/15 |

*Primary Examiner*—T. H. Tubbesing
*Attorney, Agent, or Firm*—Brown & Martin

[57] ABSTRACT

Systems and methods for determining the range from a vehicle to a plurality of reference points. In one system a mobile transceiver is located on the vehicle for transmitting a ranging interrogation signal pulse modulated on an RF carrier having a given frequency in response to a timing pulse and for receiving ranging response signal pulses modulated on RF carriers having the given frequency. A plurality of reference transponders are individually located at each of the plurality of reference points for receiving the timing pulse and the ranging interrogation signal pulse on a carrier having the given frequency and for responding thereto by transmitting a ranging response signal pulse on a carrier having the given frequency during an interval that is discrete from the intervals during which ranging response signal pulses are transmitted from the other reference transponders. Within a given time slot in relation to the timing pulse, a single ranging interrogation signal pulse is followed by a sequence of discrete ranging response signal pulses. A data processor determines and processes the phase of the received ranging response signal pulses in relation to the transmitted ranging interrogation signal pulse to determine the range from the vehicle to individual reference points, and processes the range determinations to determine the position of the vehicle by multilateration. The mobile transceiver, transponders, and transmitter each include an RF transmitter having a modulator circuit for modulating an RF carrier signal to have a predetermined shape envelope determined by the shape of a modulating signal.

23 Claims, 11 Drawing Figures

RANGING SYSTEM AND METHOD FOR DETERMINING THE RANGE OF A VEHICLE FROM A PLURALITY OF REFERENCE POINTS

BACKGROUND OF THE INVENTION

The present invention generally pertains to electronic distance measurement techniques, and is particularly directed to systems and methods for determining the range from a vehicle, such as a ship, to a plurality of reference points.

A prior art system of this nature is described in U.S. Pat. No. 4,011,562 to Robert L. Bruce. A generalized schematic representation of such system is shown in FIG. 1; and the waveforms of the various signal pulses communicated within the system of FIG. 1 are shown in FIG. 2. The system basically includes a mobile transceiver 10, which is located on the vehicle, a plurality of reference transponders 11, 12, 13, 14 respectively located at a plurality of reference points 1,2,3 and 4, a data processor 15 that is coupled to the mobile transceiver 10, and a reference transmitter 18. The locations of the reference points are presumed to be known. Typically the reference transmitter 18 is located at a reference point. The reference transmitter 18 transmits a timing pulse TP. The mobile transceiver 10 receives and responds to the timing pulse TP by interrogating the plurality of reference transponders 11, 12, 13, 14 to enable the data processor 15 to determine the range from the vehicle to each of the reference transponders. The mobile transceiver 10 transmits a multiplexed sequence of ranging interrogation signal pulses I1, I2, I3 and I4 that are modulated on an RF carrier having a given frequency. The individual reference transponders 11, 12, 13, 14 respectively respond to the timing pulse and the separate interrogation signal pulses I1, I2, I3, I4, as shown in FIG. 2, by transmitting ranging response signal pulses R1, R2, R3 and R4 on a carrier having the given frequency. Within each time slot as determined in relation to the timing pulse, there is a sequence of the respective pairs of interrogation signal pulses and response signal pulses, to wit: I1, R1, I2, R2, I3, R3, I4, R4. In FIG. 2, a transmitted signal pulse is shown by solid lines and a received signal pulse is shown by dashed lines.

In responding to the timing pulse and a detected ranging interrogation signal pulse "I", a reference transponder 11, 12, 13, 14 measures the received carrier phase of the interrogation signal in relation to an internally generated reference signal and later transmits a ranging response signal pulse "R" which replicates the carrier frequency and phase. The ranging response signal pulses R1, R2, R3, R4 are delayed in time from the end of the respective interrogation signals I1, I2, I3, I4 to which they respond, but they are phase coherent therewith. The ranging response signal pulses R1, R2, R3, R4 are received by the mobile transceiver 10. The data processor 15 then determines the range from the vehicle to the reference point at which the reference transponder is located by determining and processing the phase of the ranging response signal pulse received by the mobile transceiver 10 in relation to the transmitted ranging interrogation signal pulse. Upon determining the range from the vehicle to the plurality of reference points 1,2,3,4, it is then possible to determine the position of the vehicle by multilateration.

All phase-comparison electronic distance measuring systems have range ambiguities at multiples of the half-wavelength of the RF carrier. To resolve the ambiguities, generally one or more additional carriers whose frequency is a fraction (and wavelength a multiple) of the RF carrier having the given frequency are used to resolve the ambiguity of the range measurement.

Sometimes an offset carrier signal at a second frequency is added to or modulated onto the RF carrier having the given frequency, the offset being equal to the desired lower frequency. Generally, however, the second frequency carrier signal is transmitted simultaneously. Accordingly the frequency channel over which the transmissions are carried must be sufficiently broad to contain both the given frequency carrier signal and the second frequency carrier signal. Typically, the two RF carrier signals bear an exact integral ratio in frequency, whereby a desired combination of frequencies may not be available for allocation.

SUMMARY OF THE INVENTION

The present invention provides an improved method and system for determining the range from a vehicle to a plurality of reference points.

A reference transmitter transmits a timing pulse.

A mobile transceiver is located on the vehicle for receiving the timing pulse and transmitting a ranging interrogation signal pulse modulated on an RF carrier having a given frequency in response to the timing pulse and for receiving ranging response signal pulses modulated on RF carriers having the given frequency. A plurality of reference transponders, are individually located at each of the plurality of reference points for receiving the timing pulse and the ranging interrogation signal pulse on a carrier having the given frequency and for responding thereto by transmitting a ranging response signal pulse on a carrier having the given frequency during an interval that is discrete from the intervals during which ranging response signal pulses are transmitted from the other reference transponders, wherein within a given time slot in relation to the timing pulse, a single ranging interrogation signal pulse is followed by a sequence of the discrete ranging response signal pulses. A data processor is located on the vehicle for determining and processing the phase of the received ranging response signal pulses in relation to the transmitted ranging interrogation signal pulse to determine the range from the vehicle to individual reference points. As an option, the data processor may be adapted for processing the range determinations to determine the position of the vehicle by multilateration.

The system of the present invention is capable of measuring a given plurality of ranges in less time than with the prior art system discussed above, thereby providing an increased data rate per a given period of time.

In its preferred embodiments the present invention is capable of determining the ranges from a plurality of separate vehicles to the plurality of reference points. In such embodiments, separate mobile transceivers are respectively located on the separate vehicles, for transmitting ranging interrogation signal pulses modulated on RF carriers having the given frequency in response to the timing pulse and for receiving ranging response signal pulses modulated on RF carrier signals having the given frequency. The reference transmitter is adapted for transmitting a timing pulse at intervals exceeding the product of the time slot interval and the total number of mobile transceivers in the system. Each of the mobile transceivers is adapted for receiving the timing pulse and for responding thereto by transmitting its ranging interrogation signal pulse in a given time slot in relation to the timing pulse that is different than the time slot during which each of the other mobile transceivers transmits its ranging interrogation signal pulse. The ranging interrogation signal pulses transmitted by the different mobile transceivers following the timing pulse are separated from each other by one time slot.

In its preferred embodiments the present invention also is capable of resolving range ambiguities at multiples of the half-wavelength of the RF carrier having the given frequency.

In these embodiments, the mobile transceiver is adapted for responding to the timing pulse by further transmitting a ranging interrogation signal pulse modulated on an RF carrier having a second frequency during a given time slot in relation to the timing pulse that is discrete from the time slot in which a ranging interrogation signal pulse is transmitted on a carrier having the given frequency, and for receiving ranging response signal pulses modulated on RF carriers having the second frequency, wherein the second frequency is offset from the given frequency by an amount in a range of from one-eighth to one-twentieth of the given frequency. Each of the reference transponders is adapted for further receiving the ranging interrogation signal pulse on a carrier having the second frequency and for responding thereto by transmitting a ranging response signal pulse on a carrier having the second frequency during an interval that is discrete from the intervals during which ranging response signal pulses on carriers having second frequency are transmitted from the other reference transponders, wherein within the second ranging frequency time slot a single ranging interrogation signal pulse is followed by a sequence of the discrete ranging response signal pulses. The data processor is adapted for further determining and processing the phase of the received ranging response signal pulses on carriers having the second frequency in relation to the transmitted ranging interrogation signal pulse on a carrier having the second frequency to determine the range from the vehicle to individual reference points, and for processing the range determinations at the given frequency in relation to the range determinations at the second frequency to resolve range ambiguities at multiples of the half-wavelength of the RF carrier having the given frequency. A half-wavelength is referred to as a single lane.

Because the second frequency carrier signals are transmitted separately from the given frequency carrier signals, full transmitter power can be concentrated in the transmitted signals. Also, separate transmission of the given frequency and second frequency carrier signals simplifies the design of the transmitter and antenna loading components since they need not operate on two frequencies simultaneously.

By offsetting the second frequency from the given frequency by only a small amount in a range of from one-eighth to one-twentieth of the given frequency, desired combinations of given and second frequencies are more readily available for use upon request for allocation. Using frequency offsets within the stated range makes ambiguity resolution possible within a range of from ±4 to ±10 lanes.

In an alternative system and method according to the present invention for determining the differences in range from a vehicle to a plurality of reference points, a reference transmitter is located at one of the reference points for transmitting a timing pulse and a ranging interrogation signal pulse modulated on an RF carrier having a given frequency; and a mobile receiver is located on the vehicle for receiving the timing pulse, ranging response signal pulses, and the ranging interrogation signal pulse modulated on RF carriers having the given frequency. A plurality of reference transponders are individually located at each of the other fixed reference points for receiving the timing pulse and the ranging interrogation signal pulse on a carrier having the given frequency and for responding thereto by transmitting a ranging response signal on a carrier having the given frequency during an interval that is discrete from the intervals during which ranging response signal pulses are transmitted from the other reference transponders, wherein within a given time slot in relation to the timing pulse, a single ranging interrogation signal pulse is followed by a sequence of the discrete ranging response signal pulses.

A data processor is located on the vehicle for determining and processing the phase of the received ranging response signal pulses in relation to the received ranging interrogation signal pulse to determine the differences in range from the vehicle to the individual reference points. As an option the data processor may be adapted for processing the range difference determinations to determine the position of the vehicle in relation to the reference points by multilateration.

Because only a mobile receiver is located on the vehicle, whereby the vehicle is passive, an unlimited number of vehicles may share the system.

This alternative system may be combined with the first described system according to the present invention, whereby it may be used simultaneously by a limited number of vehicles having mobile transceivers located thereon, and by an unlimited number of vehicles having mobile receivers located thereon.

In another aspect, the present invention also provides a novel modulator circuit for modulating an RF carrier signal to have a predetermined shape envelope determined by the shape of a modulating signal. The modulator circuit of the present invention includes a balanced modulator for providing a modulated carrier signal; a directional coupler for providing the modulated carrier signal to an antenna and for receiving a reflected signal from the antenna; a forward power detector connected to the directional coupler for detecting the amplitude of the modulated carrier signal provided to the antenna, and for providing a forward power output signal indicative thereof; a reflected power detector connected to the directional coupler for detecting the amplitude of the reflected signal, and for providing a reflected power output signal indicative thereof; and a difference amplifier for comparing a modulating signal having the predetermined shape with the sum of the forward power output signal and the reflected power output signal to produce a difference signal that is provided to the balanced modulator for modulation of the RF carrier signal.

This modulator circuit is included in the mobile transceiver, the reference transponders, and the reference transmitter in the various embodiments of the vehicle position determining system of the present invention.

Certain features and advantages of this modulator circuit are discussed in the description of the preferred embodiment.

DESCRIPTION OF THE PREFERRED EMBODIMENTS

Figure 1:
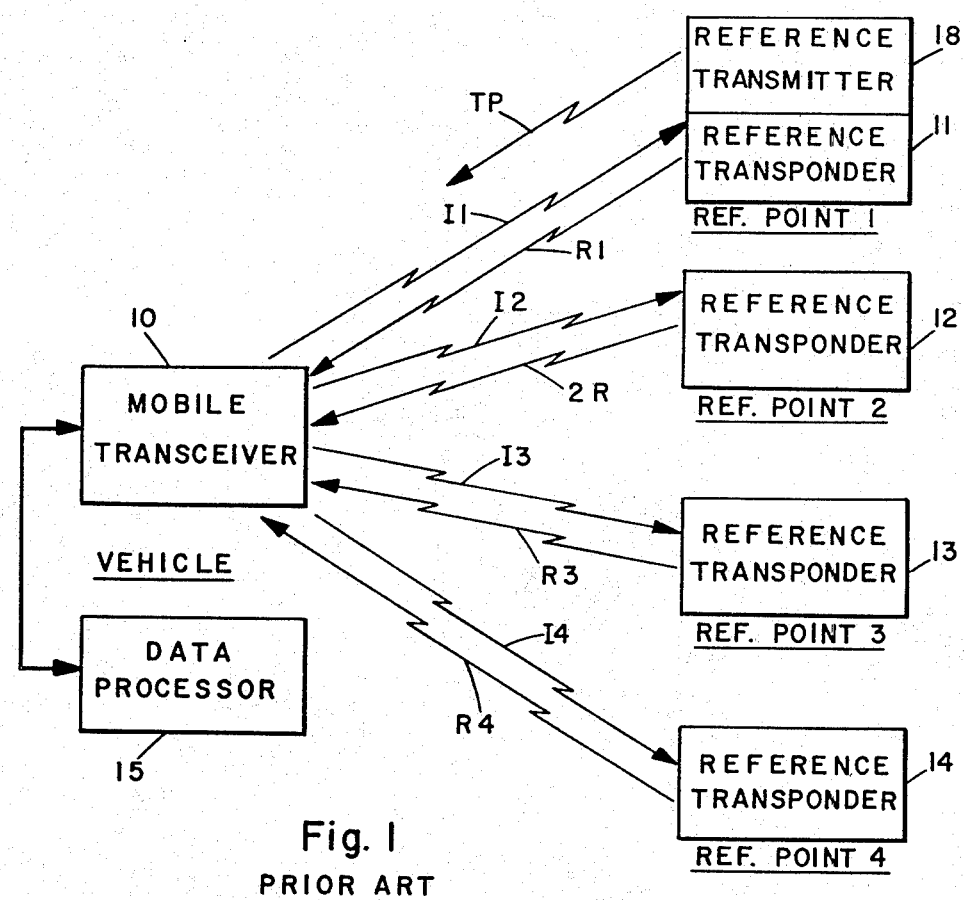
FIG. 1 is a schematic representation of a prior art system for determining the range from a vehicle to a plurality of reference points.
Figure 2:
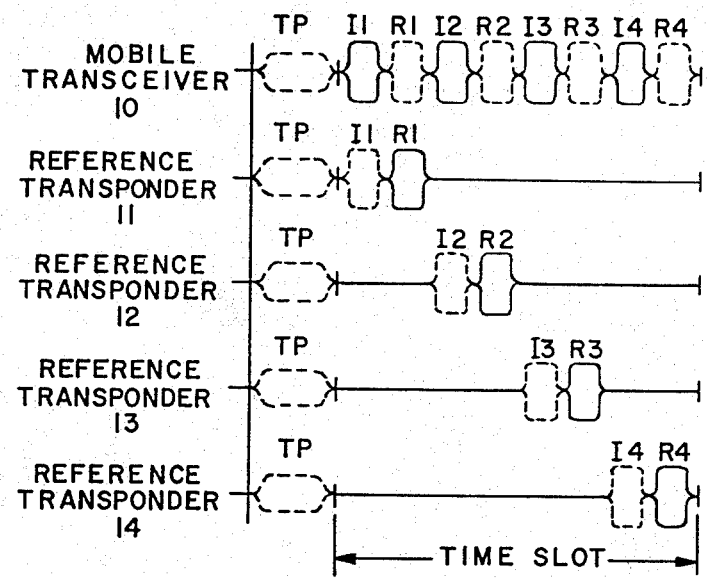
FIG. 2 illustrates the waveforms of the various signal pulses communicated throughout the prior art system shown in FIG. 1.
Figure 3:
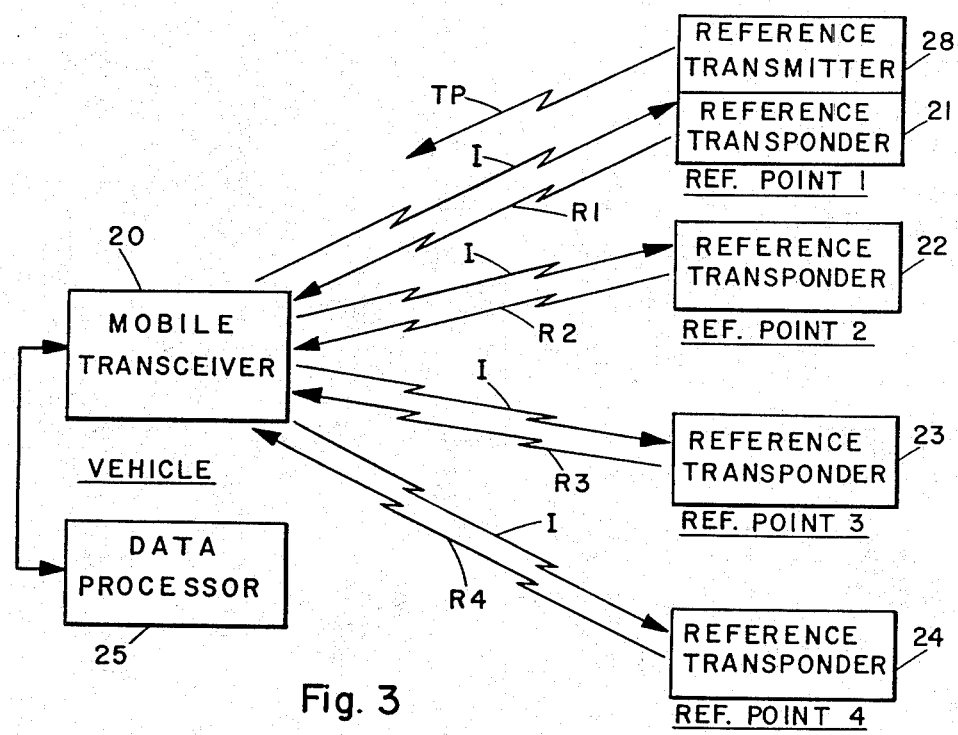
FIG. 3 is a schematic representation of a system according to the present invention for determining the range from a vehicle to a plurality of reference points.

Referring to FIG. 3, one preferred embodiment of a system according to the present invention includes a mobile transceiver 20, a plurality of reference transponders 21, 22, 23, 24, a data processor 25, and a reference transmitter 28.

Figure 4:
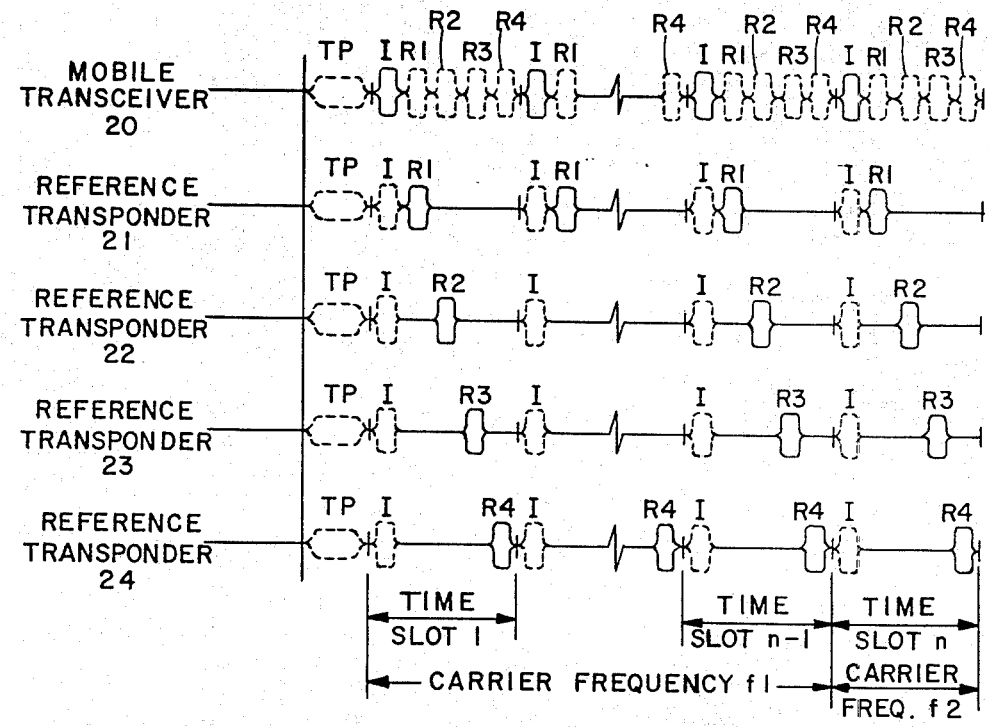
FIG. 4 illustrates the waveforms of the various signal pulses communicated throughout the system shown in FIG. 3.

The reference transmitter 28 transmits a timing pulse TP. The reference transmitter 28 is located at reference point 1. The mobile transceiver 20 is located on the vehicle for receiving the timing pulse TP and for transmitting ranging interrogation signal pulses I modulated on an RF carrier having a given frequency in response to the timing pulse TP and for receiving ranging response signal pulses R1, R2, R3, R4 modulated on RF carriers having the given frequency. Referring to FIG. 4, transmitted signal pulses are shown by solid lines and received signal pulses are shown by dashed lines.

The plurality of reference transponders 21, 22, 23, 24 are individually located at each of the plurality of fixed reference points 1,2,3,4 for receiving the timing pulse TP and the ranging interrogation signal pulse I on a carrier having the given frequency f1, and for responding thereto by transmitting a ranging response signal pulse R1, R2, R3, R4 on a carrier having the given frequency f1 during an interval that is discrete from the intervals during which ranging response signal pulses are transmitted from the other reference transponders 21, 22, 23, 24. Referring to FIG. 4 it is seen that within a given time slot as defined in relation to the timing pulse TP, a single ranging interrogation signal pulse I is followed by a sequence of the discrete ranging response signal pulses R1, R2, R3, R4. Except for the fact that the reference transponders 21, 22, 23, 24 respectively delay their response signal pulses R1, R2, R3, R4 following receipt of the interrogation signal pulse I by different durations of time so that they are transmitted during different intervals (as shown in FIG. 4), the reference transponders 21, 22, 23, 24 respond to the receipt of a timing pulse TP and an interrogation signal pulse I in the same manner as the reference transponders in the prior art system described in the above discussed U.S. Pat. No. 4,011,562, (i.e. the response signal pulse R is also delayed to be phase coherent with the received interrogation signal pulse "I").

The data processor 25 is located on the vehicle for determining and processing the phase of the received ranging response signal pulses R1, R2, R3, R4 in relation to the transmitted ranging interrogation signal pulse I to determine the range from the vehicle to individual reference points, 1,2,3,4. The data processor 25 also is adapted for processing the range determinations to determine the position of the vehicle by multilateration.

In the system of FIG. 3, the mobile transceiver 20 is adapted for responding to the timing pulse TP by further transmitting a ranging interrogation signal pulse I modulated on an RF carrier having a second frequency f2 during a given time slot in relation to the timing pulse TP that is discrete from the time slot in which a ranging interrogation signal pulse is transmitted on a carrier having the given frequency f1, and for receiving ranging response signal pulses R modulated on RF carriers having the second frequency f2. The second frequency f2 is offset from the given frequency f1 by an amount in a range of from one-eighth to one-twentieth of the given frequency f1. The signal pulses I and R1, R2, R3, R4 are modulated on a carrier having the second frequency f2 only during the nth time slot of a frame having n time slots as shown in FIG. 4.

Each of the reference transponders 21, 22, 23, 24 is adapted for further receiving the ranging interrogation signal pulse I on a carrier having the second frequency f2 and for responding thereto by transmitting a ranging response signal pulse R1, R2, R3, R4 on a carrier having the second frequency f2 during an interval that is discrete from the intervals during which ranging response signal pulses on carriers having the second frequency f2 are transmitted from the other reference transponders 21, 22, 23, 24. Within the second ranging frequency time slot "n", a single ranging interrogation signal pulse I is followed by a sequence of the discrete ranging response signal pulses R1, R2, R3, R4.

The data processor 25 is adapted for further determining and processing the phase of the received ranging response signal pulses R1, R2, R3, R4 on carriers having the second frequency f2 in relation to the transmitted ranging interrogation signal pulse I on a carrier having the second frequency f2 to determine the range from the vehicle to individual reference points, 1,2,3,4, and for processing the range determinations at the given frequency f1 in relation to the range determinations at the second frequency f2 to resolve range ambiguities at multiples of the half-wavelength of the RF carrier having the given frequency f1.

Figure 5:
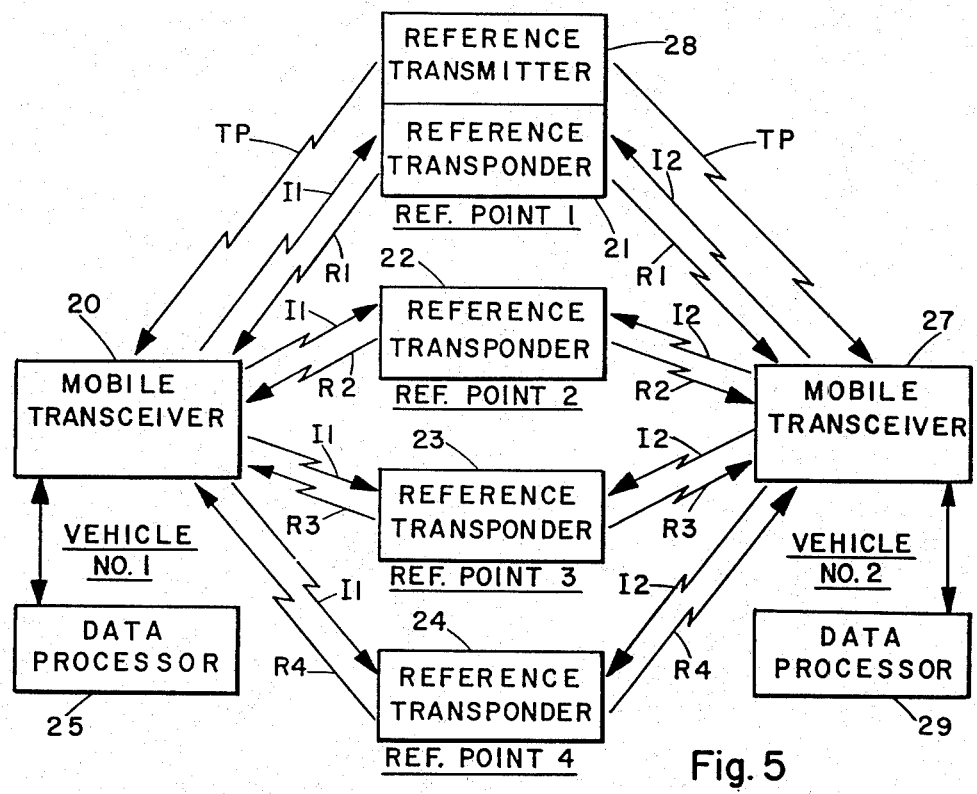
FIG. 5 is a schematic representation of one preferred embodiment of the system of the present invention.
Figure 6:
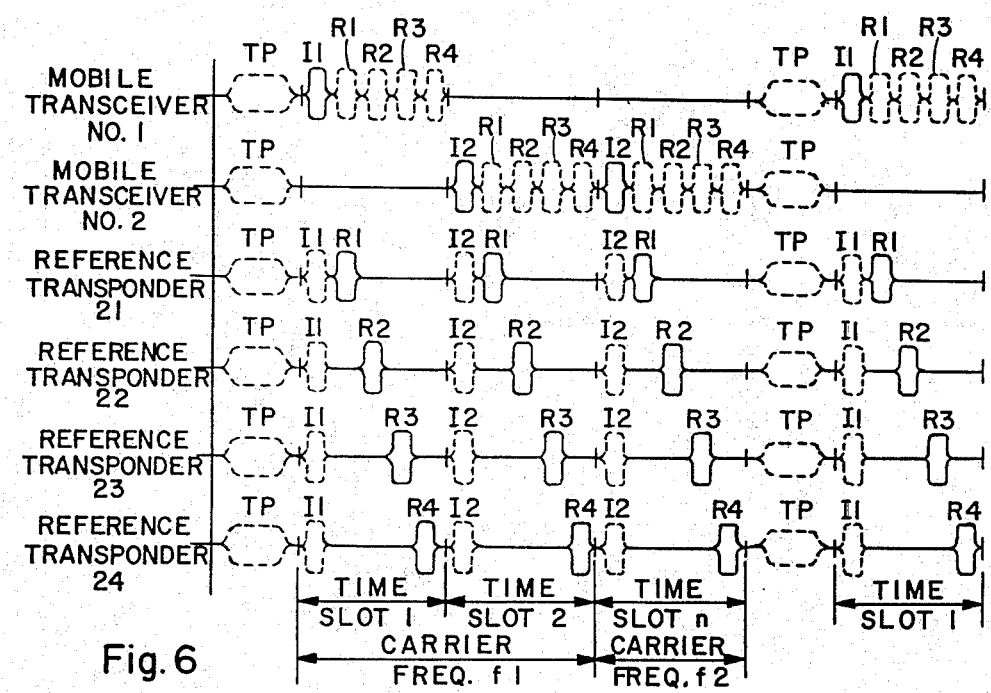
FIG. 6 illustrates the waveforms of the various signal pulses communicated throughout the system shown in FIG. 5.

Referring now to FIGS. 5 and 6, the system of the present invention as shown in FIG. 3 is modified so that it can be used by a plurality of vehicles. Mobile transceiver 20 which is located on vehicle No. 1; the reference transponders 21, 22, 23, 24 and the data processor 25 perform the same functions as in the system of FIG. 3. There is an additional mobile transceiver 27, which is located on a vehicle No. 2 for receiving the timing pulse TP and for transmitting a ranging interrogation signal pulse I2 modulated on an RF carrier having the given frequency f1 in response to the timing pulse TP, and for receiving ranging response signal pulses R1, R2, R3, R4 modulated on RF carrier signal having the given frequency f1. The interrogation pulse I2 is identical to the interrogation pulse I1 from the mobile transceiver 20, the only difference being the source and the time slot which it occupies.

The reference transmitter 28 is adapted for transmitting a timing pulse "TP" at intervals exceeding the product of the time slot interval and the total number of mobile transceivers 20, 27 in the system as shown in FIG. 6.

Each of the mobile transceivers 20, 27 is adapted for receiving the timing pulse TP and for responding thereto by transmitting its ranging interrogation signal pulse I1, I2 at an interval following the timing pulse that is different than the interval at which the other mobile transceiver 27, 20 transmits its ranging interrogation signal pulse I2, I1. The ranging interrogation signal pulses I1, I2 transmitted by the different mobile transceivers 20, 27 following the timing pulse TP are separated from each other by one time slot.

A data processor 29 is also located on the second vehicle for determining and processing the phase of the received ranging response signal pulses R1, R2, R3, R4 in relation to the transmitted ranging interrogation signal pulse I2 to determine the range from vehicle No. 2 to the individual reference points 1,2,3,4. The data processor 29 also is adapted to process the range determinations to determine the position of vehicle No. 2 by multilateration.

In the system of FIG. 5, each of the plurality of mobile transceivers 20, 27 transmits a ranging interrogation signal pulse modulated on an RF carrier having the given frequency f1 during its own different time slot in relation to the timing pulse TP. The mobile transceiver 27 further responds to the timing pulse TP by transmitting an additional ranging interrogation signal pulse I2 modulated on an RF carrier having the second frequency f2 during the nth time slot, following the timing pulse TP, as shown in FIG. 6.

Figure 7:
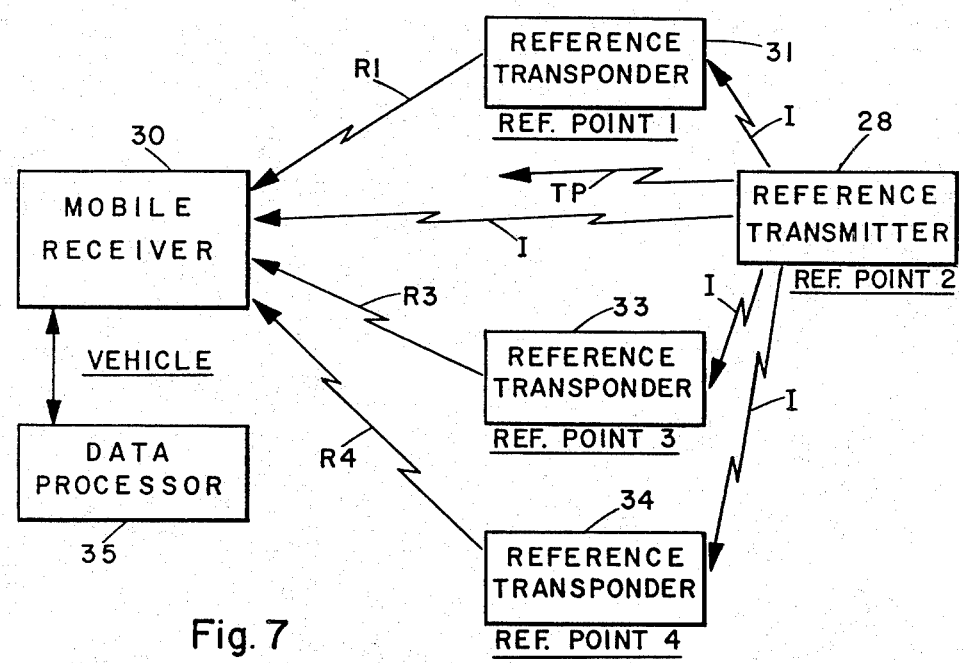
FIG. 7 is a schematic representation of an alternative system according to the present invention for determining the range differences from a vehicle to a plurality of reference points.

An alternative system according to the present invention for determining the range differences from a vehicle to a plurality of reference points is shown in FIG. 7. This system includes a mobile receiver 30, reference transponders 31, 33, 34, a reference transmitter 28 and a data processor 35.

The reference transmitter 28 is located at the reference point 2 for transmitting a timing pulse TP and a ranging interrogation signal pulse I modulated on an RF carrier having a given frequency f1.

The mobile receiver 30 is located on the vehicle for receiving the timing pulse TP, ranging response signal pulses R1, R2, R3, R4, and the ranging interrogation signal pulse I modulated on RF carriers having the given frequency f1.

Figure 8:
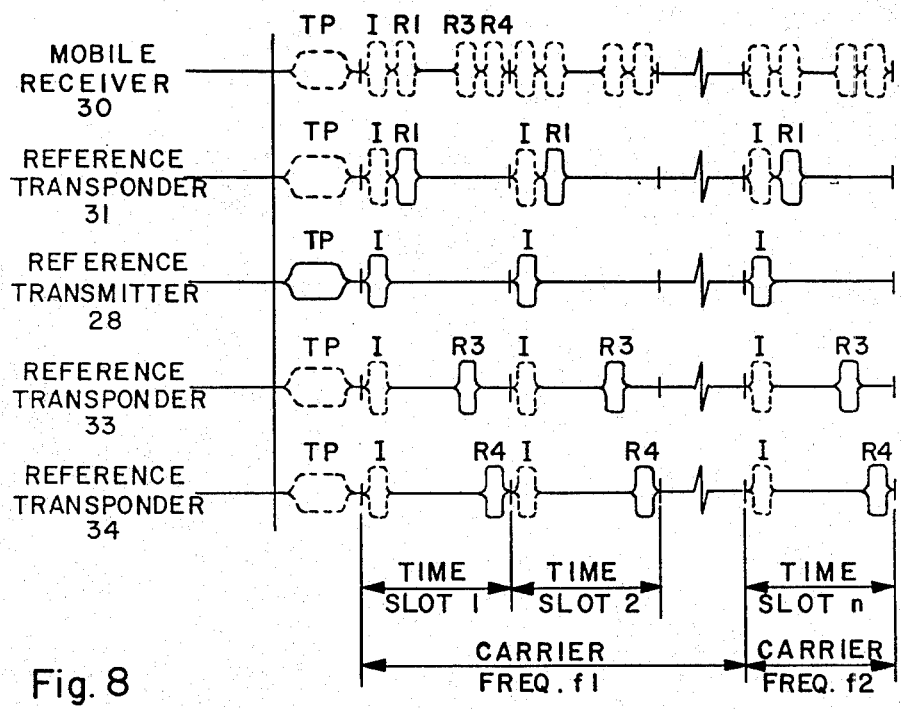
FIG. 8 illustrates the waveforms of the various signal pulses communicated throughout the system shown in FIG. 7.

The reference transponders 31, 33, 34 are individually located at each of the other fixed reference points 1,3,4 for receiving the timing pulse TP and the ranging interrogation signal pulse I on a carrier having the given frequency f1 and for responding thereto by transmitting a ranging response signal R1, R3, R4 on a carrier having the given frequency during an interval that is discrete from the intervals during which ranging response signal pulses are transmitted from the other reference transponders R1, R3, R4. Referring to FIG. 8, it is seen that within a given time slot as defined in relation to the timing pulse TP, a single ranging interrogation signal pulse I is followed by a sequence of the discrete ranging response signal pulses R1, R3, R4. The reference transponders 31, 33, 34 function in the same manner as the reference transponders 21, 22, 23, 24 in the system of FIG. 3. The data processor 35 is located on the vehicle for determining and processing the phase of the received ranging response signal pulses R1, R3, R4 in relation to the received ranging interrogation signal pulse I to determine the differences in range from the vehicle to the individual reference points 1,2,3,4. The data processor 35 also is adapted for processing the range difference determinations to determine the position of the vehicle by multilateration.

In the system of FIG. 7, the reference transmitter 28 is adapted for responding to the timing pulse TP by further transmitting a ranging interrogation signal pulse I modulated on an RF carrier having a second frequency f2 during the nth time slot following the timing pulse TP. The nth time slot is discrete from the time slots in which a ranging interrogation signal pulse is transmitted on a carrier having the given frequency f1. The second frequency f2 is offset from the given frequency f1 by an amount in a range of from one-eighth to one-twentieth of the given frequency f1. The signal pulses I and R1, R3, R4 are modulated on a carrier having the second frequency f2 only during the nth time slot of a frame having n time slots as shown in FIG. 8.

The mobile receiver 30 is adapted for further receiving ranging response signal pulses R1, R3, R4 and the ranging interrogation signal pulse I modulated on RF carriers having the second frequency f2.

Each of the reference transponders 31, 33, 34 is adapted for further receiving the ranging interrogation signal pulse I on a carrier having the second frequency f2 and for responding thereto by transmitting a ranging response signal pulse R1, R3, R4 on a carrier having the second frequency f2 during an interval that is discrete from the intervals during which ranging response signal pulses on carriers having the second frequency f2 are transmitted from the other reference transponders 31, 33, 34. Within the second ranging frequency time slot "n" a single ranging interrogation signal pulse I is followed by a sequence of the discrete ranging response signal pulses R1, R3, R4.

The data processor 35 is adapted for further determining and processing the phase of the received ranging response signal pulses R1, R3, R4 on carriers having the second frequency f2 in relation to the received ranging interrogation signal pulse I on a carrier having the second frequency f2 to determine the differences in range from the vehicle to individual reference points 1,2,3,4, and for processing the range difference determinations at the given frequency f1 in relation to the range difference determinations at the second frequency f2 to resolve range ambiguities at multiples of the half-wavelength of the RF carrier having the given frequency f1.

Figure 9:
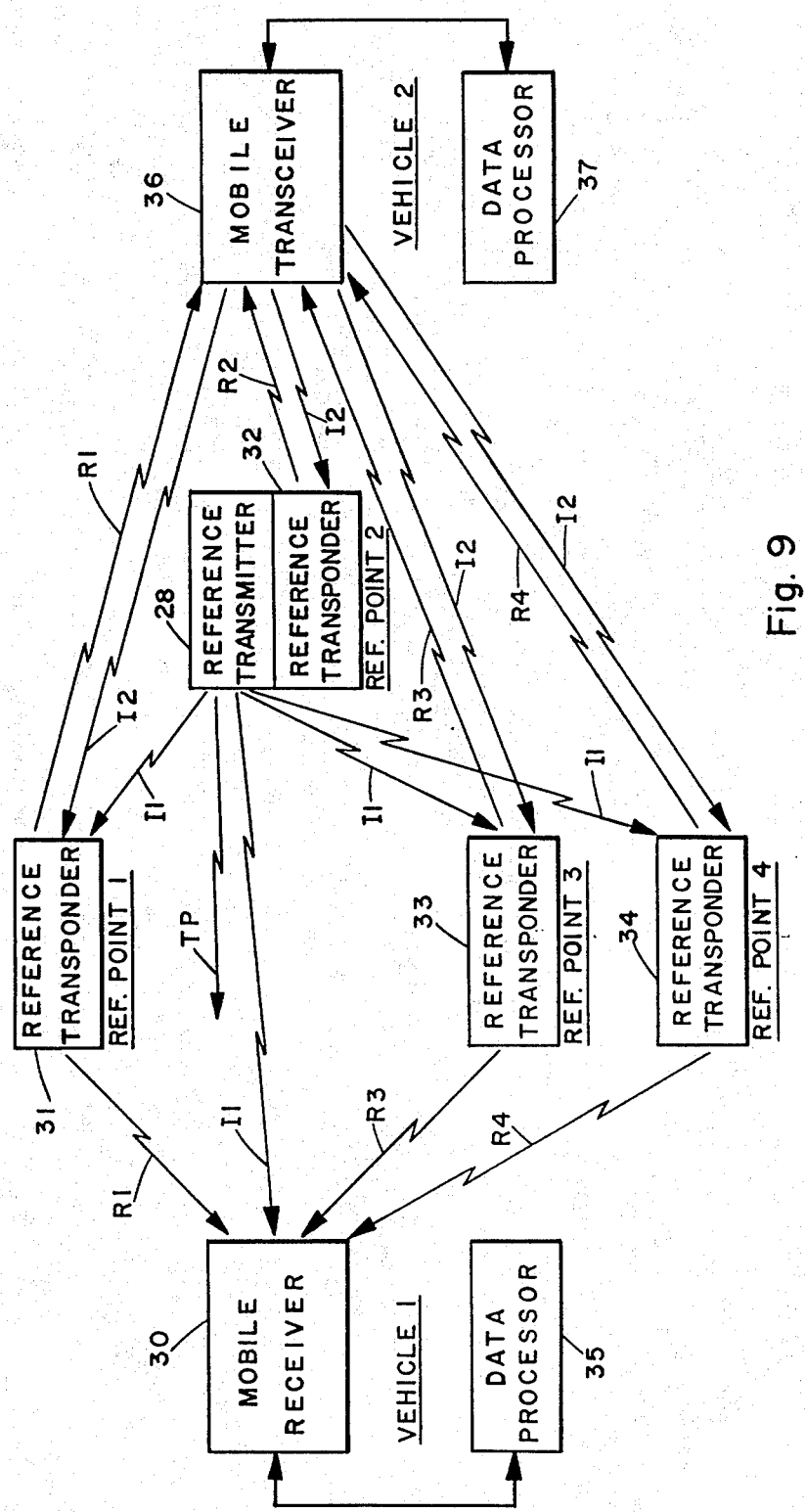
FIG. 9 is a schematic representation of a combination of the systems of FIGS. 3 and 7.
Figure 10:
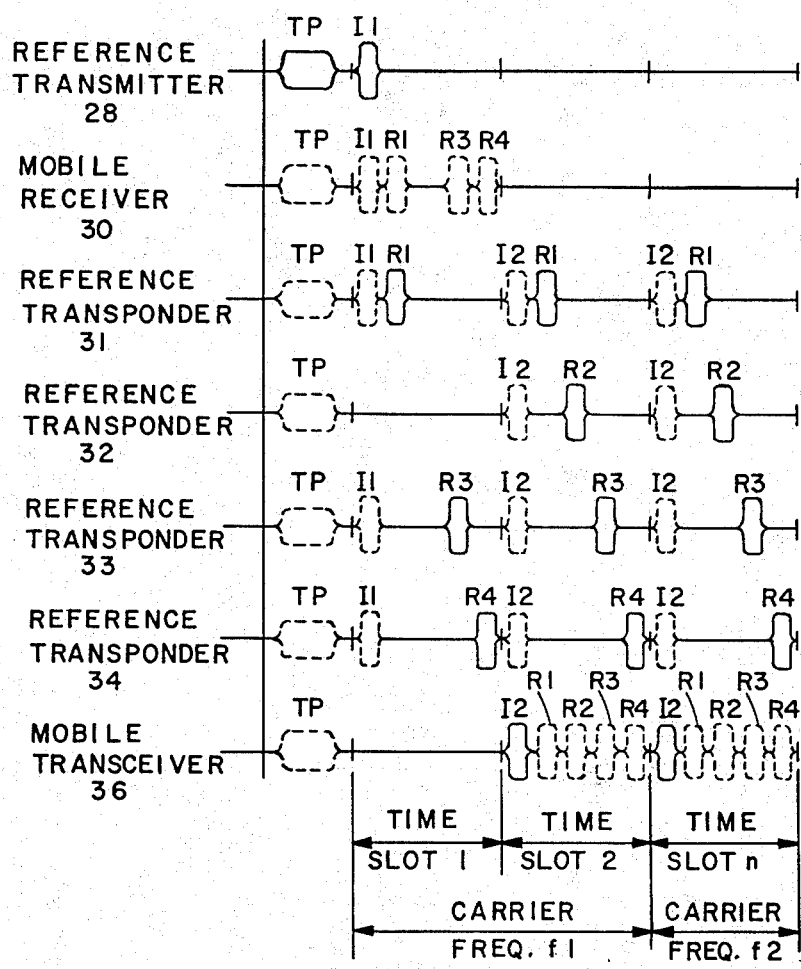
FIG. 10 illustrates the waveforms of the various signal pulses communicated throughout the system shown in FIG. 9.

Referring to FIGS. 9 and 10, the systems of FIGS. 3 and 7 are combined. The combined system includes a mobile receiver 30, a reference transmitter 28, reference transponders 31, 32, 33, 34, a first data processor 35, a mobile transceiver 36 and a second data processor 37.

The reference transmitter 28 is located at reference point 1 for transmitting a timing pulse TP and a first ranging interrogation signal pulse I1 modulated on an RF carrier having a given frequency f1.

The mobile receiver 30 is located on a first vehicle for receiving the timing pulse TP, ranging response signal pulses R1, R3, R4 and the first ranging interrogation signal pulse I1 modulated on RF carriers having the given frequency f1. The response signal pulses and the first interrogation signal pulse are received by the mobile receiver 30 in the first time slot following the timing pulse TP.

The mobile transceiver 36 is located on a second vehicle for receiving the timing pulse TP and for transmitting a second ranging interrogation signal pulse I2 modulated on an RF carrier having a given frequency f1 in response to the timing pulse TP, and for receiving ranging response signal pulses R1, R2, R3, R4 modulated on RF carriers having the given frequency f1. The second interrogation signal pulse I2 is transmitted and the response signal pulses R1, R2, R3, R4 are received by the mobile transceiver 36 in the second time slot following the timing pulse TP.

The reference transponders 31, 32, 33, 34 are individually located at each of a plurality of the reference points 1,2,3,4 for receiving the timing pulse TP and the first and second ranging interrogation signal pulses I1, I2 on a carrier having the given frequency f1 and for responding thereto by transmitting a ranging response signal pulse R1, R2, R3, R4 on a carrier having the given frequency f1 during an interval that is discrete from the intervals during which ranging response signal pulses are transmitted from the other reference transponders 31, 32, 33, 34. Within the first time slot following the timing pulse TP the first ranging interrogation signal pulse I1 is followed by a sequence of the discrete ranging response signal pulses; R1, R3, R4. During the second time slot following the timing pulse TP, the second interrogation pulse I2 is followed by a sequence of discrete ranging response signal pulses R1, R2, R3, R4.

The first data processor 35 is located on the first vehicle for determining and processing the phase of the received ranging response signal pulses R1, R3, R4 in relation to the received first ranging interrogation signal pulse I1 to determine the differences in range from the first vehicle to the individual reference points 1,2,3,4.

The second data processor 37 is located on the second vehicle for determining and processing the phase of the received ranging response signal pulses R1, R2, R3, R4 in relation to the transmitted second ranging interrogation signal pulse I2 to determine the range from the second vehicle to the individual reference points.

The system of FIG. 9 is useful by an unlimited number of vehicles having mobile receivers and data processors located thereon and by a limited number of vehicles having mobile transceivers and data processors located thereon. In the system of FIG. 9 including a plurality of mobile transceivers 36, the mobile tranceivers 36 are respectively located on separate vehicles, for transmitting a second ranging interrogation signal pulse modulated on an RF carrier having the given frequency in response to the timing pulse, and for receiving ranging response signal pulses modulated on RF carrier signals having the given frequency.

The reference transmitter 28 is adapted for transmitting the timing pulse at intervals exceeding the product of the time slot interval and one plus the total number of mobile transceivers 36 in the system.

Each of the mobile transceivers 36 is adapted for receiving the timing pulse and for responding thereto by transmitting its ranging interrogation signal pulse in a given time slot in relation to the timing pulse that is different than the time slot during which each of the other mobile transceivers 36 transmits its ranging interrogation signal pulse. The second ranging interrogation signal pulses transmitted by the different mobile transceivers following the timing pulse are separated from each other by one time slot.

In the system of FIG. 9, the mobile transceiver 36 is adapted for responding to the timing pulse by further transmitting a ranging interrogation signal pulse I2 modulated on an RF carrier having a second frequency f2 during the nth time slot following the timing pulse TP, and for receiving ranging response signal pulses R1, R2, R3, R4 modulated on RF carriers having the second frequency f2. The second frequency f2 is offset from the given frequency f1 by an amount in a range of from one-eighth to one-twentieth of the given frequency.

Each of the reference transponders 31, 32, 33, 34 is adapted for further receiving the ranging interrogation signal pulse I2 on a carrier having the second frequency f2 and for responding thereto by transmitting a ranging response signal pulse R1, R2, R3, R4 on a carrier having the second frequency f2 during an interval that is discrete from the intervals during which ranging response signal pulses on carriers having second frequency are transmitted from the other reference transponders. Within the nth time slot a single ranging interrogation signal pulse I2 is followed by a sequence of the discrete ranging response signal pulses R1, R2, R3, R4.

The second data processor 37 is adapted for further determining and processing the phase of the received ranging response signal pulses R1, R2, R3, R4 on carriers having the second frequency f2 in relation to the transmitted ranging interrogation signal pulse I2 on a carrier having the second frequency f2 to determine the range from the vehicle to individual reference points 1,2,3,4 and for processing the range determinations at the given frequency f1 in relation to the range determinations at the second frequency f2 to resolve range ambiguities at multiples of the half-wavelength of the RF carrier having the given frequency f1.

Figure 11:
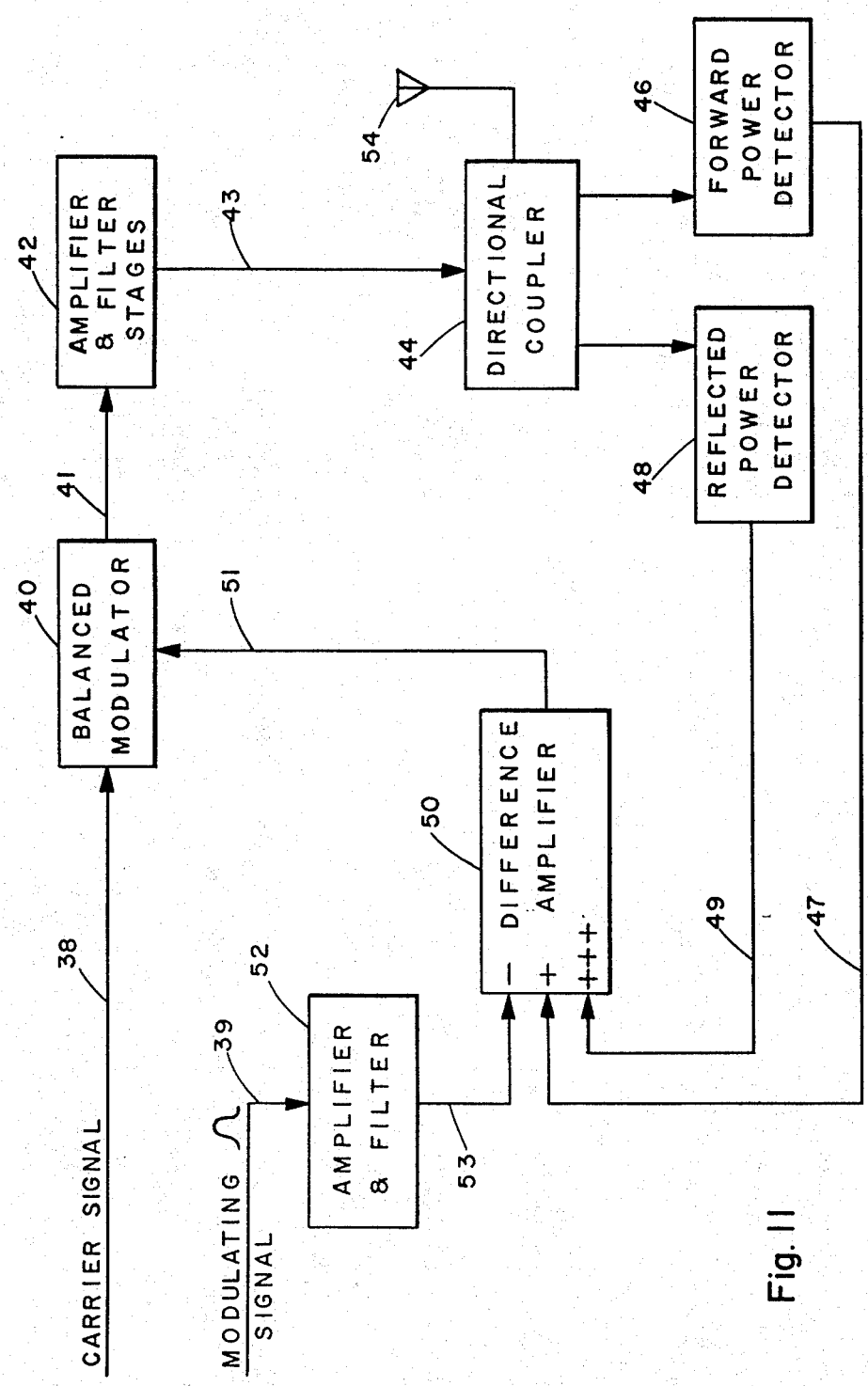
FIG. 11 is a schematic block diagram of a modulator circuit according to the present invention.

In the systems of FIGS. 3, 5, 7 and 9, the mobile transceivers 20, 27, 36, the reference transponders 21, 22, 23, 24, 31, 32, 33, 34, and the reference transmitter 28 each includes an RF transmitter having a modulator circuit for modulating an RF carrier signal to have a predetermined shape envelope determined by the shape of a modulating signal. This modulator circuit is shown in FIG. 11. It includes a balanced modulator 40, amplifier and filter stages 42, a directional coupler 44, a forward power detector 46, a reflected power detector 48, a difference amplifier 50 and an amplifier and filter 52.

The balanced modulator 40 modulates a carrier signal on line 38 with the signal on line 51 to provide a modulated carrier signal on line 41. The amplifier and filter stages 42 amplify the modulated carrier signal to provide an amplified modulated carrier signal on line 43. The directional coupler 44 provides the amplified modulated carrier signal to an antenna 54, and also receives a reflected signal from the antenna 54.

The forward power detector 46 is connected to the directional coupler 44 for detecting the amplitude of the modulated carrier signal provided to the antenna 54 and for providing a forward power output signal on line 47 that is indicative thereof.

The reflected power detector 48 is connected to the directional coupler 44 for detecting the amplitude of the reflected signal from the antenna 54 and for providing a reflected power output signal on line 49 that is indicative thereof.

A modulating signal having the predetermined shape is provided on line 39, amplified by the amplifier and filter 52, and provided to the difference amplifier 50 on line 53.

The difference amplifier 50 compares the modulating signal having the predetermined shape on line 53 with the sum of the forward power output signal on line 47 and the reflected power output signal on line 49 to produce a difference signal on line 51 that is provided to the balanced modulator 40 for modulation of the RF carrier signal on line 38.

The forward power detector 46 is biased to provide a relatively linear relationship between the forward power output signal on line 47 and a low-level modulated carrier signal on line 43.

The reflected power detector 48 is not biased. Therefore no reflected power output signal is provided on line 49 in response to a low-level reflected signal from the antenna 54.

The difference amplifier 50 is adapted for weighting the reflected power output signal on line 49 more heavily than the forward power output signal on line 47 when comparing the sum thereof with the modulating signal on line 53, so that if an appreciable reflected signal is detected the amplitude of the difference signal provided to the balanced modulator 40 on line 51 is reduced to protect the transmitter against high VSWR loads.

The inputs to the difference amplifier 50 are weighted such that the Peak Envelope Power output is 100 watts when the reflected power is low. The reflected power output signal on line 49 is weighted more heavily than the forward power output signal on line 47 so that if appreciable reflected signal is detected, the modulator drive is reduced by as much as 3:1 (10 dB). Although this technique effectively protects the transmitter against high VSWR loads, including open and short circuits, the pulse envelope shape is not appreciably distorted.

We claim:

1. A system for determining the range from a vehicle to a plurality of reference points, comprising
    a reference transmitter for transmitting a timing pulse;
    a mobile transceiver located on the vehicle for receiving the timing pulse and for transmitting a ranging interrogation signal pulse modulated on an RF carrier having a given frequency in response to the timing pulse, and for receiving ranging response signal pulses modulated on RF carriers having the given frequency;
    a plurality of reference transponders, one of which is located at each of the plurality of reference points for receiving the timing pulse and the ranging interrogation signal pulse on a carrier having the given frequency and for responding thereto by transmitting a ranging response signal pulse on a carrier having the given frequency during an interval that is discrete from the intervals during which ranging response signal pulses are transmitted from the other reference transponders, wherein within a given time slot in relation to the timing pulse, a single ranging interrogation signal pulse is followed by a sequence of the discrete ranging response signal pulses; and
    processing means located on the vehicle for determining and processing the phase of the received ranging response signal pulses in relation to the transmitted ranging interrogation signal pulse to determine the range from the vehicle to the individual reference points.

2. A system according to claim 1, further comprising at least one additional mobile transceiver, wherein the mobile transceivers are respectively located on separate vehicles, for transmitting a ranging interrogation signal pulse modulated on an RF carrier having the given frequency in response to the timing pulse, and for receiving ranging response signal pulses modulated on RF carrier signals having the given frequency;
    wherein the reference transmitter is adapted for transmitting the timing pulse at intervals exceeding the product of the time slot interval and the total number of mobile transceivers in the system; and
    wherein each of the mobile transceivers is adapted for receiving the timing pulse and for responding thereto by transmitting its ranging interrogation signal pulse in a given time slot in relation to the timing pulse that is different than the time slot during which each of the other mobile transceivers transmits its ranging interrogation signal pulse, and wherein the ranging interrogation signal pulses transmitted by the different mobile transceivers following the timing pulse are separated from each other by one time slot.

3. A system according to claim 1, wherein the mobile transceiver comprises means for responding to the timing pulse by further transmitting a ranging interrogation signal pulse modulated on an RF carrier having a second frequency during a given time slot in relation to the timing pulse that is discrete from the time slot in which a ranging interrogation signal pulse is transmitted on a carrier having the given frequency, and for receiving ranging response signal pulses modulated on RF carriers having the second frequency, wherein the second frequency is offset from the given frequency by an amount in a range of from one-eighth to one-twentieth of the given frequency;
    wherein each of the reference transponders comprises means for further receiving the ranging interrogation signal pulse on a carrier having the second frequency and for responding thereto by transmitting a ranging response signal pulse on a carrier having the second frequency during an interval that is discrete from the intervals during which ranging response signal pulses on carriers having second frequency are transmitted from the other reference transponders, wherein within the second ranging frequency time slot a single ranging interrogation signal pulse is followed by a sequence of the discrete ranging response signal pulses; and
    wherein the processing means comprises means for further determining and processing the phase of the received ranging response signal pulses on carriers having the second frequency in relation to the transmitted ranging interrogation signal pulse on a carrier having the second frequency to determine the range from the vehicle to individual reference points, and for processing the range determinations at the given frequency in relation to the range determinations at the second frequency to resolve range ambiguities at multiples of the half-wavelength of the RF carrier having the given frequency.

4. A system according to claim 1, wherein the processing means comprises means for processing the range determinations to determine the position of the vehicle in relation to the reference points by multilateration.

5. A system according to claim 1, wherein the mobile transceiver and the reference transponders each includes an RF transmitter having a modulator circuit for modulating an RF carrier signal to have a predetermined shape envelope determined by the shape of a modulating signal, comprising
   a balanced modulator for providing a modulated carrier signal;
   a directional coupler for providing the modulated carrier signal to an antenna, and for receiving a reflected signal from the antenna;
   a forward power detector connected to the directional coupler for detecting the amplitude of the modulated carrier signal provided to said antenna, and for providing a forward power output signal indicative thereof;
   a reflected power detector connected to the directional coupler for detecting the amplitude of the reflected signal, and for providing a reflected power output signal indicative thereof; and
   a difference amplifier for comparing a modulating signal having the predetermined shape with the sum of the forward power output signal and the reflected power output signal to produce a difference signal that is provided to the balanced modulator for modulation of the RF carrier signal.

6. A system according to claim 5, further comprising means for biasing the forward power detector to provide a relatively linear relationship between the forward power output signal and a low-level modulated carrier signal; and
   wherein the reflected power detector is not biased whereby no reflected power output signal is provided in response to a low-level reflected signal.

7. A system according to claim 6, wherein the difference amplifier comprises means for weighting the reflected power output signal more heavily than the forward power output signal when comparing the sum thereof with the modulating signal so that if an appreciable reflected signal is detected the amplitude of the difference signal provided to the modulator is reduced to protect the transmitter against high VSWR loads.

8. A ranging system, comprising
   a reference transmitter located at one of a plurality of reference points for transmitting a timing pulse and a first ranging interrogation signal pulse modulated on an RF carrier having a given frequency;
   a mobile receiver located on a first vehicle for receiving the timing pulse, ranging response signal pulses and the first ranging interrogation signal pulse modulated on RF carriers having the given frequency, wherein the response signal pulses and the first interrogation signal pulse are received in a given time slot in relation to the timing pulse;
   a mobile transceiver located on a second vehicle for receiving the timing pulse and for transmitting a second ranging interrogation signal pulse modulated on an RF carrier having a given frequency in response to the timing pulse, and for receiving ranging response signal pulses modulated on RF carriers having the given frequency, wherein the second interrogation signal pulse is transmitted and the response signal pulses are received in a given time slot in relation to the timing pulse that is discrete from the given time slot in which the first interrogation signal pulse and the ranging response signal pulses are received by the mobile receiver;
   a plurality of reference transponders, one of which is located at each of a plurality of the reference points for receiving the timing pulse and a said ranging interrogation signal pulse on a carrier having the given frequency and for responding thereto by transmitting a ranging response signal pulse on a carrier having the given frequency during an interval that is discrete from the intervals during which ranging response signal pulses are transmitted from the other reference transponders, wherein within a given time slot in relation to the timing pulse, a single ranging interrogation signal pulse is followed by a sequence of the discrete ranging response signal pulses;
   first processing means located on the first vehicle for determining and processing the phase of the received ranging response signal pulses in relation to the received first ranging interrogation signal pulse to determine the differences in range from the first vehicle to the individual reference points; and
   second processing means located on the second vehicle for determining and processing the phase of the received ranging response signal pulses in relation to the transmitted second ranging interrogation signal pulse to determine the range from the second vehicle to the individual reference points.

9. A system according to claim 8, further comprising at least one additional mobile transceiver, wherein the mobile transceivers are respectively located on separate vehicles, for transmitting a second ranging interrogation signal pulse modulated on an RF carrier having the given frequency in response to the timing pulse, and for receiving ranging response signal pulses modulated on RF carrier signals having the given frequency;
   wherein the reference transmitter is adapted for transmitting the timing pulse at intervals exceeding the product of the time slot interval and one plus the total number of mobile transceivers in the system; and
   wherein each of the mobile transceivers is adapted for receiving the timing pulse and for responding thereto by transmitting its ranging interrogation signal pulse in a given time slot in relation to the timing pulse that is different than the time slot during which each of the other mobile transceivers transmits its ranging interrogation signal pulse, and wherein the second ranging interrogation signal pulses transmitted by the different mobile transceivers following the timing pulse are separated from each other by one time slot.

10. A system according to claim 8, wherein the mobile transceiver comprises means for responding to the timing pulse by further transmitting a ranging interrogation signal pulse modulated on an RF carrier having a second frequency during a given time slot in relation to the timing pulse that is discrete from the time slot in which a second ranging interrogation signal pulse is transmitted on a carrier having the given frequency, and for receiving ranging response signal pulses modulated on RF carriers having the second frequency, wherein the second frequency is offset from the given frequency by an amount in a range of from one-eighth to one-twentieth of the given frequency;

wherein each of the reference transponders comprises means for further receiving the ranging interrogation signal pulse on a carrier having the second frequency and for responding thereto by transmitting a ranging response signal pulse on a carrier having the second frequency during an interval that is discrete from the intervals during which ranging response signal pulses on carriers having second frequency are transmitted from the other reference transponders, wherein within the second ranging frequency time slot a single ranging interrogation signal pulse is followed by a sequence of the discrete ranging response signal pulses; and wherein the second processing means comprises means for further determining and processing the phase of the received ranging response signal pulses on carriers having the second frequency in relation to the transmitted ranging interrogation signal pulse on a carrier having the second frequency to determine the range from the vehicle to individual reference points, and for processing the range determinations at the given frequency in relation to the range determinations at the second frequency to resolve range ambiguities at multiples of the half-wavelength of the RF carrier having the given frequency.

11. A system for determining the differences in range from a vehicle to a plurality of reference points, comprising a reference transmitter located at one of the reference points for transmitting a timing pulse and a ranging interrogation signal pulse modulated on an RF carrier having a given frequency;

a mobile receiver located on the vehicle for receiving the timing pulse, ranging response signal pulses, and the ranging interrogation signal pulse modulated on RF carriers having the given frequency;

a plurality of reference transponders, one of which is located at each of the other reference points for receiving the timing pulse and the ranging interrogation signal pulse on a carrier having the given frequency and for responding thereto by transmitting a ranging response signal on a carrier having the given frequency during an interval that is discrete from the intervals during which ranging response signal pulses are transmitted from the other reference transponders, wherein within a given time slot in relation to the timing pulse a single ranging interrogation signal pulse is followed by a sequence of the discrete ranging response signal pulses; and processing means located on the vehicle for determining and processing the phase of the received ranging response signal pulses in relation to the received ranging interrogation signal pulse to determine the differences in range from the vehicle to the individual reference points.

12. A system according to claim 11, wherein the reference transmitter comprises means for further transmitting a ranging interrogation signal pulse modulated on an RF carrier having a second frequency during a given time slot in relation to the timing pulse that is discrete from the time slot in which a ranging interrogation signal pulse is transmitted on a carrier having the given frequency, wherein the second frequency is offset from the given frequency by an amount in a range of from one-eighth to one-twentieth of the given frequency;

wherein the mobile receiver comprises means for further receiving ranging response signal pulses and the ranging interrogation signal pulse modulated on RF carriers having the second frequency;

wherein each of the reference transponders comprises means for further receiving the ranging interrogation signal pulse on a carrier having the second frequency and for responding thereto by transmitting a ranging response signal pulse on a carrier having the second frequency during an interval that is discrete from the intervals during which ranging response signal pulses on carriers having the second frequency are transmitted from the other reference transponders, wherein within the second ranging frequency time slot a single ranging response signal pulses; and wherein the processing means comprises means for further determining and processing the phase of the received ranging response signal pulses on carriers having the second frequency in relation to the received ranging interrogation signal pulse on a carrier having the second frequency to determine the differences in range from the vehicle to individual reference points, and for processing the range difference determinations at the given frequency in relation to the range difference determinations at the second frequency to resolve range difference ambiguities at multiples of the half-wavelength of the RF carrier having the given frequency.

13. A system according to claim 11, wherein the processing means comprises means for processing the range difference determinations to determine the position of the vehicle in relation to the reference points by a hyperbolic principle.

14. A system according to claim 11, wherein the reference transmitter and the reference transponders each include an RF transmitter having a modulator circuit for modulating an RF carrier signal to have a predetermined shape envelope determined by the shape of a modulating signal, comprising a balanced modulator for providing a modulated carrier signal;

a directional coupler for providing the modulated carrier signal to an antenna, and for receiving a reflected signal from the antenna;

a forward power detector connected to the directional coupler for detecting the amplitude of the modulated carrier signal provided to said antenna, and for providing a forward power output signal indicative thereof;

a reflected power detector connected to the directional coupler for detecting the amplitude of the reflected signal, and for providing a reflected power output signal indicative thereof; and a difference amplifier for comparing a modulating signal having the predetermined shape with the sum of the forward power output signal and the reflected power output signal to produce a difference signal that is provided to the balanced modulator for modulation of the RF carrier signal.

15. A system according to claim 14, further comprising means for biasing the forward power detector to provide a relatively linear relationship between the forward power output signal and a low-level modulated carrier signal; and the reflected power detector is not biased, wherein no reflected power output signal is provided in response to a low-level reflected signal.

16. A system according to claim 15, wherein the difference amplifier comprising means for weighting the reflected power output signal more heavily than the forward power output signal when comparing the sum thereof with the modulating signal so that if an appreciable reflected signal is detected the amplitude of the difference signal provided by the modulator is reduced to protect the transmitter against high VSWR loads.

17. A method for determining the position of a vehicle in relation to a plurality of reference points, comprising the steps of transmitting a timing pulse;

transmitting a ranging interrogation signal pulse from the vehicle in response to the timing pulse wherein the interrogation signal pulse is modulated on an RF carrier having a given frequency;

receiving the timing pulse and the ranging interrogation signal pulse at each of the plurality of reference points and responding thereto by transmitting a ranging response signal pulse modulated on an RF carrier having the given frequency during an interval that is discrete from the intervals during which ranging response signal pulses are transmitted from the other reference points, wherein within a given time slot in relation to the timing pulse, a single ranging interrogation signal pulse is followed by a sequence of the discrete ranging response signal pulses;

receiving the ranging response signal pulses at the vehicle;

determining and processing the phase of the received ranging response signal pulses in relation to the transmitted ranging interrogation signal pulse to determine the range from the vehicle to the individual reference points.

18. A method according to claim 17, further comprising the step of processing the range determinations to determine the position of the vehicle in relation to the fixed reference points by multilateration.

19. A method according to claim 17, further comprising the steps of transmitting a ranging interrogation signal pulse from at least one additional vehicle in response to the timing pulse, wherein each ranging interrogation signal pulse is modulated on an RF carrier having the given frequency;

transmitting the timing pulse at intervals exceeding the product of the time slot interval and the total number of vehicles from which ranging interrogation signal pulses are transmitted;

receiving the timing pulse and responding thereto by transmitting the ranging interrogation signal pulse from each vehicle in a given time slot in relation to the timing pulse that is different than the time slot which each of the ranging interrogation signal pulses is transmitted from the other vehicles and wherein the ranging interrogation signal pulses transmitted from the different vehicles following the timing pulse are separated from each other by one time slot.

20. A method according to claim 17, further comprising the steps of transmitting a second ranging interrogation signal pulse from the vehicle in response to the timing pulse, wherein the second ranging interrogation signal pulse is modulated on an RF carrier having a second frequency during a given time slot in relation to the timing pulse that is discrete from the time slot in which a ranging interrogation signal pulse is transmitted on a carrier having the given frequency, wherein the second frequency is offset from the given frequency by an amount in a range of from one-eighth to one-twentieth of the given frequency;

receiving the ranging interrogation signal pulse on carriers having the second frequency at each of the plurality of fixed reference points, and responding thereto by transmitting a ranging response signal pulse on a carrier having the second frequency during an interval that is discrete from the intervals during which ranging response signal pulses on carriers having the second frequency are transmitted from the other reference points, wherein within the second ranging frequency time slot a single ranging interrogation signal pulse is followed by a sequence of the discrete ranging response signal pulses;

receiving the ranging response signal pulses modulated on RF carriers having the second frequency at the vehicle; and determining and processing the phase of the received ranging response signal pulses on carriers having the second frequency in relation to the transmitted ranging interrogation signal pulse on a carrier having the second frequency to determine the range from the vehicle to the individual reference points; and processing the range determinations at the given frequency in relation to the range determinations at the second frequency to resolve range ambiguities at multiples of the half-wavelength of the RF carrier having the given frequency.

21. A method for determining the differences in range from a vehicle in relation to a plurality of reference points, comprising the steps of transmitting a timing pulse and a ranging interrogation signal pulse from one of the reference points, wherein the ranging interrogation signal pulse is modulated on an RF carrier having a given frequency;

receiving the timing pulse and the ranging interrogation signal pulse at each of the other reference points and responding thereto by transmitting a ranging response signal modulated on an RF carrier having the given frequency during an interval that is discrete from the intervals during which ranging response signal pulses are transmitted from the other reference points, wherein within a given time slot in relation to the timing pulse, a single ranging interrogation signal pulse is followed by a sequence of the discrete ranging response signal pulses; and receiving the ranging response signal pulses at the vehicle;

receiving the ranging interrogation signal pulses at the vehicle; and determining and processing the phase of the received ranging response signal pulses in relation to the received ranging interrogation signal pulse to determine the differences in range from the vehicle to the individual reference points.

22. A method according to claim 21, further comprising the step of processing the range determinations to determine the position of the vehicle by a hyperbolic principle.

23. A method according to claim 21, further comprising the steps of transmitting a second ranging interrogation signal pulse from the one reference point, wherein the second ranging interrogation signal pulse is modulated on an RF carrier having a second frequency during a given time slot in relation to the timing pulse that is discrete from the time slot in which a ranging interrogation signal pulse is transmitted on a carrier having the given frequency, wherein the second frequency is offset from the given frequency by an amount in a range of from one-eighth to one-twentieth of the given frequency;

receiving the ranging interrogation signal pulses on carriers having the second frequency at each of the other fixed reference points and responding thereto by transmitting a ranging response signal pulse modulated on an RF carrier having the second frequency during an interval that is discrete from the intervals during which ranging response signal pulses on carriers having the second frequency are transmitted from the other reference points, wherein within the second ranging frequency time slot a single ranging interrogation signal pulse is followed by a sequence of the discrete ranging response signal pulses;

receiving the ranging response signal pulses at the vehicle on carriers having the second frequency; and receiving the ranging interrogation signal pulse at the vehicle on a carrier having the second frequency;

determining and processing the phase of the received ranging response signal pulses on carriers having the second frequency in relation to the received ranging interrogation signal pulse on a carrier having the second frequency to determine the differences in range from the vehicle to the individual reference points; and processing the range difference determinations at the given frequency in relation to the range difference determinations at the second frequency to resolve range difference ambiguities at multiples of the half-wavelength of the RF carrier having the given frequency.

* * * * *